Dec. 19, 1967      F. H. SAMUELSON      3,358,346

CARBIDE CUTTING TOOLS AND METHODS OF FABRICATION

Filed May 6, 1966

INVENTOR
FRED H. SAMUELSON
BY Richard U. James
ATTORNEY

United States Patent Office  3,358,346
Patented Dec. 19, 1967

---

3,358,346
CARBIDE CUTTING TOOLS AND METHODS OF FABRICATION
Fred H. Samuelson, Suffield, Conn., assignor to United Aircraft Corporation, East Hartford, Conn., a corporation of Delaware
Filed May 6, 1966, Ser. No. 548,095
6 Claims. (Cl. 29—103)

This invention relates in general to cutting tools and, more particularly, to metal working tools having inserts of a very hard material affixed to the cutting surface thereof, and methods of fabricating the same.

It is common practice in today's machining operations to utilize drill bits and other cutting tools wherein one or more cutting inserts of a very hard material, such as tungsten carbide, are suitably fastened to the end of the bit. Grooves may be formed in the end of the tool body and the inserts brazed thereinto, or the inserts may be held against the flat end of the tool by several insert-retaining members which are brazed to the flat end of the tool and provide support for the cutting inserts. Unfortunately, however, the usual method of manufacture of drill bits of this type requires exposure of the insert material and/or that of the drill shank to temperatures which adversely affect their physical properties as a result of heating operations which are a necessary incident to the known methods of fabrication.

It is a primary object of the present invention to provide a process for fabricating cutting tools having carbide inserts whereby the particular physical properties inherent in the various materials are not adversely affected by the fabrication operations.

An additional object of this invention is generally to provide improved cutting tools for metal working processes.

It is extremely important in the manufacture of cutting tools to utilize base materials which are hard enough to resist erosion by the particles liberated in the particular machining process involved and yet tough enough to withstand the rigors of the machining operations. On the other hand, very high hardness is the most fundamental requirement of the cutting edge. Because the physical characteristics required of the material at the shank portion of the tool and at the cutting edge are different, the use of different materials in these areas is dictated and, accordingly, an assembled structure must be used.

In current methods of fabrication wherein carbide inserts are brazed directly into grooves machined in the end of the tool body, the tool as a whole may suffer a loss of hardness as a result of the heating applied incident to the brazing operation. Further, close tolerance must be maintained between the groove walls and the respective inserts to assure proper flow of the braze material. Still further, even if by proper selection of materials the temperature conditions of the brazing operation are adjusted such that the material hardness is retained, it is possible to develop severe locked-in stresses in the carbide insert because of differential thermal shrinkage.

The above-described difficulties are minimized or eliminated by the method of fabrication taught in the present invention which can best be described by reference to the attached drawings of which:

Figure 1:
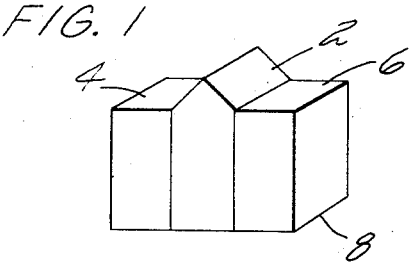
FIGURE 1 is a perspective view of a single point drill bit subassembly.

Described broadly, the process contemplated herein comprises the sandwiching of a carbide insert 2, or insert of some other hard cutting material, between two metal side members, 4 and 6, in a brazing operation to form a sandwich-type subassembly 8, as illustrated in FIGURE 1, and subsequently affixing the subassembly or subassemblies to a tool body 12 by means of an electron beam weld between the metal side members and the tool body.

In the preparation of the sandwich-type subassemblies it is possible, by the proper selection of materials and by matching the brazing temperature with the preferred heat treatment temperature for the materials, to hold the high hardness of the metal layers and, of course, that of the cutting edges. Any adverse effect on the toughness of the metal clad as a result of the brazing heat is relatively immaterial. As opposed to the body material of the tool, toughness of the metal clad in the sandwich construction is not of overriding importance.

Figure 6:
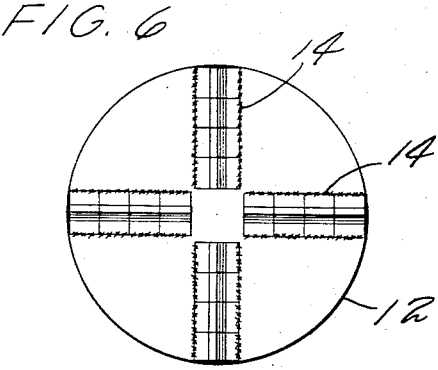
FIGURE 6 is an end view of an assembled drill bit illustrating four composite drill bit assemblies welded into the grooves provided in the end of the cutting tool.
Figure 5:
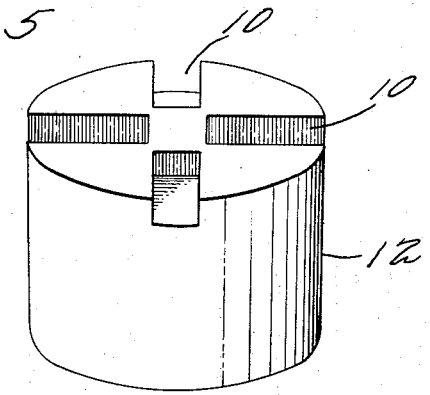
FIGURE 5 is a fragmentary perspective view of the cutting tool body illustrating the grooves formed in the end thereof for receipt of the bit subassemblies depicted in the preceding figures.

Following the preparation of the metal-carbide-metal subassemblies 8, they are suitably positioned on the cutting surface of the tool body 12. A preferred method of attachment of the subassemblies comprises positioning the subassemblies in their preferred orientation in cooperating grooves 10 provided in the tool body and, subsequently thereto, electron beam welding the metal clad to the tool body, as shown in FIGURE 6. It will be noted that, while very localized alteration of the physical properties of the materials may result from the welding operation, the overall properties of the sandwich structure and the tool body material are not adversely affected. Any decrease in hardness consequent to the welding operation is confined to the weld bead 14 itself and areas immediately adjacent thereto. The reason for the preferred use of electron beam welding in the joinder process is obvious since a minimum exposed weld bead area and heat affected zone is produced thereby.

While the maximum thickness of the metal clad material is relatively immaterial, it is essential that the minimum thickness be such that the heat transfer therethrough during the welding operation does not have a deleterious effect on the carbide-metal braze previously made. This affords an additional reason why the welding of the subassembly to the tool body by means of an electron beam is the much preferred technique since both the weld bead and the heat affected zone are held to minimum width in this manner.

To reduce the locked-in stresses in the hard cutting material which may result from differential thermal expansions and contractions, it is sometimes possible in the production of the sandwich-type subassemblies to select a metal for the clad which has a coefficient of expansion corresponding to that of the hard cutting material. When this is possible the other physical properties of the clad must also be considered, particularly its hardness and its weldabality with the body material of the tool.

Figure 4:
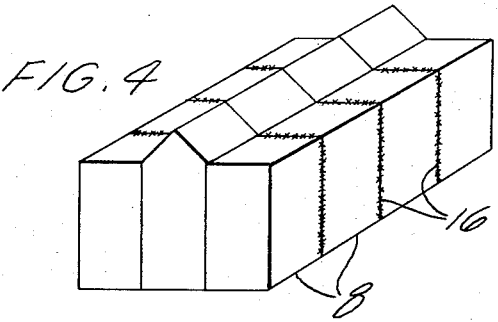
FIGURE 4 is a perspective view of a composite drill bit assembly comprising a build-up of the individual subassemblies shown in the preceding figures.

A preferred alternative method of reducing the above-mentioned stresses, particularly in subassemblies of considerable length, is to form a composite structure as shown in FIGURE 4. In this method a plurality of single point subassemblies, such as shown in FIGURE 1, are built up into the desired composite, the requisite buildup being effected by welds 16 joining the adjacent surfaces of the metal clad. In this formation, the use of electron beam welding is the much preferred technique for the reasons previously discussed. The use of multiple inserts allows a distribution of stress over the individual segments and eliminates the cumulative stress effect otherwise encountered.

Another alternative method of reducing the locked-in stresses contemplates the interposition of a ductile shim, such as nickel, between the carbide and the clad.

Figure 2:
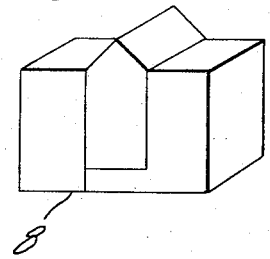
FIGURE 2 illustrates a modification of the single point subassembly of FIGURE 1.
Figure 3:
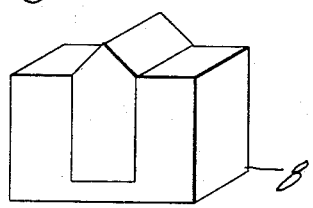
FIGURE 3 shows an additional modification of the subassemblies of FIGURES 1 and 2.

The single point inserts illustrated in FIGURES 2 and 3 are optional embodiments of the insert provided in FIGURE 1 and differ only in the configuration of the steel cladding. In FIGURE 2, for example, the carbide insert is caused to rest on a projecting shoulder provided on one of the steel blocks, the joint between the two blocks being welded or brazed during the normal brazing cycle. In the embodiment shown in FIGURE 3, a channel is provided in a single piece of material into which the insert is positioned.

In the fabrication methods described above it will be noted that the body of the tool itself is at no time subjected to the braze cycle and the heat treatment temperatures associated therewith. To the contrary, the only elevated temperature to which the main body of the tool is subjected is confined to a very narrow area adjacent to the weld bead which is made to fasten the subassemblies to the tool body. Since the brazing temperatures may be selected such that a good braze is accomplished with no adverse effect on the carbide insert and no softening of the clad material, there is very little surface presented to the abrasive particles released in the machining operation which may be eroded during use of the tool. The only deterioration in properties of the various materials involved is a possible lessening of the toughness of the clad material surrounding the hard carbide. But, as previously indicated, this is of no serious consequence since this clad material does not require the toughness required of the tool shank.

Further, since it is possible to maintain the high hardness of the materials, there is no tendency to erosion of the metal immediately adjacent the carbide, the progressive effect of which would otherwise lead to a lessening of support and loosening of the hard insert resulting in chipping and eventual failure of the cutting surfaces. In addition, individual quality control testing of the sandwich-type subassemblies is readily accomplished prior to incorporation into the final assembly.

It will be readily seen from the foregoing that a cutting tool has been provided which is cheaply manufactured and which has suffered no deterioration of properties of the various components of which it is composed during the fabrication processes.

While the invention has been illustrated and described in connection with several preferred embodiments, it will be understood that many other embodiments are possible and are contemplated within the true spirit of the invention as set forth in the appended claims.

What is claimed is:

1. In the fabrication of cutting tools wherein inserts of a hard cutting material are fastened to the tool body, the method of attaching the hard material to the tool body comprising the steps of:

jacketing the cutting material with a metallic support structure of substantial thickness, leaving the cutting edge exposed, brazing the metallic support structure to the cutting material to form a metal-cutting material-metal, sandwich-type subassembly, positioning the subassembly on the body of the tool in its preferred orientation, and welding the metallic support structure to the tool body with an electron beam.

2. In the fabrication of carbide cutting tools, the method of attaching the carbide cutters to the tool body comprising the steps of:

cladding each carbide cutter with a metallic support structure of substantial thickness in a brazing cycle, leaving the cutting edge exposed and forming a metal-carbide-metal, sandwich-type subassembly, providing a tool body having a groove formed in its cutting end to closely receive the subassembly and providing a preferred orientation for the cutting surfaces, positioning the subassembly in the groove, and welding the metallic support structures to the tool body with an electron beam.

3. The method of fabricating cutting tools according to claim 1 comprising the additional step of:

interposing a ductile shim between the carbide and the metallic support structure prior to the brazing cycle to form a metal-shim-carbide-shim-metal, sandwich-type subassembly.

4. The method of fabricating cutting tools comprising the steps of:

forming the carbide cutters in the desired shape, brazing a metallic structural member on the opposing sides of the carbide cutters to form metal-carbide-metal, sandwich-type subassemblies, positioning a plurality of subassemblies end for end to a desired cutter length, joining the adjacent edges of the metallic structural members by welding with an electron beam to produce a composite insert, positioning the composite insert on the tool body in its preferred orientation, and welding the metallic support structure to the tool body with an electron beam.

5. The method of fabricating cutting tools according to claim 4 in which the composite insert is positioned in a cooperating groove provided in the cutting end of the tool body.

6. A cutting tool comprising a tool body having at least one groove found in its cutting end, a plurality of metallic insert-supporting members of substantial thickness welded to the sides of the groove along the length thereof, the individual insert-supporting members on opposite sides of the groove being axially coextensive with each other and defining an insert-receiving cavity therebetween and a carbide cutting insert closely received in each cavity between the opposing insert-supporting members and brazed thereto, the brazed joints constituting the sole connections between the respective inserts and the rest of the tool assembly.

No references cited.

HARRISON L. HINSON, *Primary Examiner.*